(12) United States Patent
Bian

(10) Patent No.: US 11,100,022 B2
(45) Date of Patent: Aug. 24, 2021

(54) INTERFACE ADAPTER DEVICE AND MOBILE TERMINAL

(71) Applicant: VIVO MOBILE COMMUNICATION CO., LTD., Guangdong (CN)

(72) Inventor: Donglei Bian, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/759,763

(22) PCT Filed: Oct. 22, 2018

(86) PCT No.: PCT/CN2018/111225
§ 371 (c)(1),
(2) Date: Apr. 28, 2020

(87) PCT Pub. No.: WO2019/085784
PCT Pub. Date: May 9, 2019

(65) Prior Publication Data
US 2021/0182229 A1    Jun. 17, 2021

(30) Foreign Application Priority Data
Oct. 30, 2017   (CN) .......................... 201711036993.8

(51) Int. Cl.
*G06F 13/38*     (2006.01)
*G06F 13/42*     (2006.01)
(Continued)

(52) U.S. Cl.
CPC ............ *G06F 13/385* (2013.01); *G06F 13/42* (2013.01); *H01R 24/62* (2013.01); *H01R 31/06* (2013.01);
(Continued)

(58) Field of Classification Search
CPC ....... G06F 13/385; G06F 13/42; H01R 24/60; H01R 31/06
See application file for complete search history.

(56) References Cited

U.S. PATENT DOCUMENTS 10,256,585 B1 *   4/2019   Wierenga ............... H01R 31/06
10,725,722 B1 *   7/2020   Koelmel ............... G06F 3/1446
(Continued)

FOREIGN PATENT DOCUMENTS

CN        201450206 U      5/2010
CN        203205671 U      9/2013
(Continued)

OTHER PUBLICATIONS

Extended European Search Report dated Nov. 19, 2020 issued in PCT/CN2018/111225.
(Continued)

*Primary Examiner* — Zachary K Huson
(74) *Attorney, Agent, or Firm* — Gearhart Law LLC; David Postolski, Esq.

(57) ABSTRACT

The present disclosure provides an interface adapter device and a mobile terminal. The interface adapter device comprises a male connector and a third contact and a fourth contact provided on the male connector, wherein the male connector comprises a first end provided with a first interface and a second end provided with a second interface, the first and second ends are two opposite ends of the male connector, the third contact is electrically coupled to the second interface, the fourth contact is electrically coupled to the first interface, and the first and second ends of the male connector are insertable into the female connector; the third contact is in contact with the first contact when the male connector is inserted into the female connector through the first end, and the fourth contact is in contact with the second contact when the male connector is inserted into the female connector through the second end.

20 Claims, 2 Drawing Sheets

(51) Int. Cl.
*H01R 24/62* (2011.01)
*H01R 31/06* (2006.01)
*H01R 24/60* (2011.01)

(52) U.S. Cl.
CPC ............ *G06F 2213/0042* (2013.01); *G06F 2213/3806* (2013.01); *H01R 24/60* (2013.01)

(56) References Cited

U.S. PATENT DOCUMENTS

| | | | |
|---|---|---|---|
| 2017/0054260 A1 | 2/2017 | Wang et al. | |
| 2017/0162990 A1* | 6/2017 | Wu | H02J 7/00 |
| 2017/0302045 A1* | 10/2017 | Wang | H01R 24/78 |
| 2019/0348807 A1* | 11/2019 | Lu | G06K 19/077 |

FOREIGN PATENT DOCUMENTS

| | | |
|---|---|---|
| CN | 204496921 U | 7/2015 |
| CN | 205509189 U | 8/2016 |
| CN | 205583330 U | 9/2016 |
| CN | 106099469 A | 11/2016 |
| CN | 205724287 U | 11/2016 |
| CN | 107834327 A | 3/2018 |
| KR | 20160064788 A | 6/2016 |
| KR | 101697067 B1 | 1/2017 |
| WO | 2011163256 A1 | 12/2011 |

OTHER PUBLICATIONS

May 14, 2020 Written Opinion issued in PCT/CN2018/111225.
Nov. 16, 2018 Search Report issued in Chinese Application No. 201711036993.8.

* cited by examiner

INTERFACE ADAPTER DEVICE AND MOBILE TERMINAL

CROSS-REFERENCE TO RELATED APPLICATION

This application is the U.S. national phase of PCT application No. PCT/CN2018/111225 filed on Oct. 22, 2018, which claims a priority to Chinese Patent Application No 201711036993.8 files on Oct. 30, 2017, the disclosure of which is incorporated in its entirety by reference herein.

TECHNICAL FIELD

The present disclosure relates to the field of communication technology, and in particular to an interface adapter device and a mobile terminal.

BACKGROUND

With rapid development of mobile terminals, the mobile terminals have become indispensable tools in people's lives and have brought great convenience to all aspects of users' lives. However, with an increasing number of types of mobile terminals, there are also many structural differences between different types of mobile terminals. For example, current Universal Serial Bus (USB) interfaces arranged on different types of mobile terminals are different, and if a mobile terminal needs to transmit data through a data cable, but the interface of the mobile terminal and the interface of the data cable belong to different types of interfaces, then there is great limitation in the use of the mobile terminal.

SUMMARY

The present disclosure is achieved as follows: in a first aspect, embodiments of the present disclosure provide an interface adapter device applied to a mobile terminal including a female connector, wherein the female connector has a first contact and a second contact; the interface adapter device includes a male connector and a third contact and a fourth contact provided on the male connector, wherein the male connector has a first end provided with a first interface and a second end provided with a second interface, the first and second ends are two opposite ends of the male connector, the third contact is electrically coupled to the second interface, the fourth contact is electrically coupled to the first interface, and the first and second ends of the male connector are insertable into the female connector; the third contact is in contact with the first contact when the male connector is inserted into the female connector through the first end, and the fourth contact is in contact with the second contact when the male connector is inserted into the female connector through the second end.

In a second aspect, embodiments of the present disclosure further provide a mobile terminal including a female connector which has a first contact and a second contact.

In embodiments of the present disclosure, when the male connector is inserted into the female connector through the first end, the third contact is in contact with the first contact, and at this time, a data cable can match the second interface at the second end of the male connector; and when the male connector is inserted into the female connector through the second end, the fourth contact is in contact with the second contact, and at this time, the data cable can match the first interface at the first end of the male connector.

BRIEF DESCRIPTION OF THE DRAWINGS

In order to illustrate the technical solutions of the embodiments of the present disclosure more apparently, the accompanying drawings required in the description of the embodiments of the present disclosure will be briefly introduced below. It is evident that the drawings used in the following description relate to only some embodiments of the present disclosure, and based on these drawings, the other drawings can be obtained by those of ordinary skill in the art without exercising any creative work.

DETAILED DESCRIPTION

Embodiments of the present invention provide an interface adapter device and a mobile terminal to solve the problem that there is great limitation in the use of the mobile terminal due to the interface of the mobile terminal belonging to a different type from an interface of a data cable when it is required to transmit data with the data cable.

In order to solve this technical problem, the technical solutions in the embodiments of the present disclosure will be clearly and completely described hereinafter with reference to the accompanying drawings used in the embodiments of the present disclosure. Obviously, the described embodiments are a part, rather than all, of the embodiments of the present disclosure. Based on the described embodiments of the present disclosure, all the other embodiments obtained by those of ordinary skill in the art without making creative efforts fall within the protection scope of the present disclosure.

Figure 1:
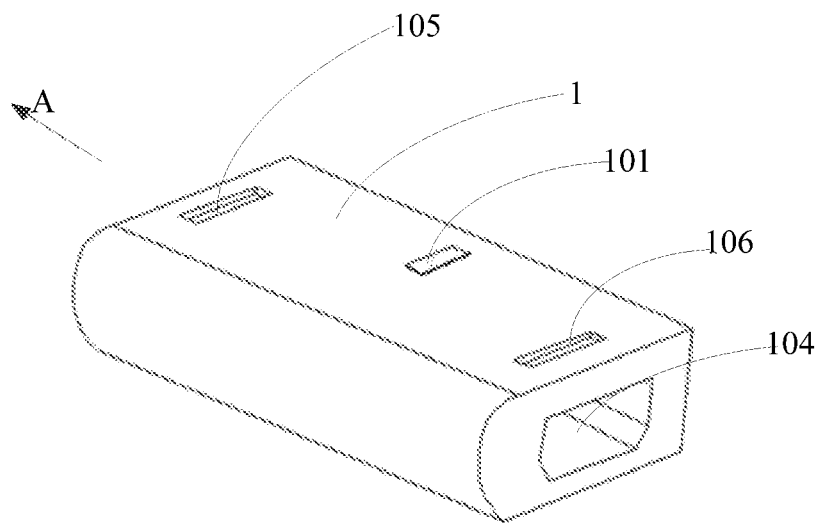
FIG. 1 is a structural diagram of an interface adapter device in a first state provided in embodiments of the present disclosure.
Figure 2:
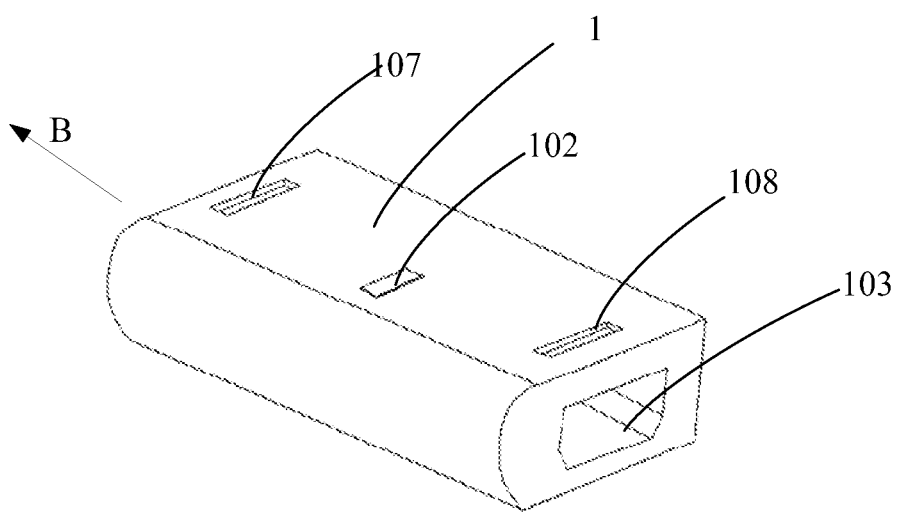
FIG. 2 is a structural diagram of the interface adapter device in a second state provided in the embodiments of the present disclosure.
Figure 3:
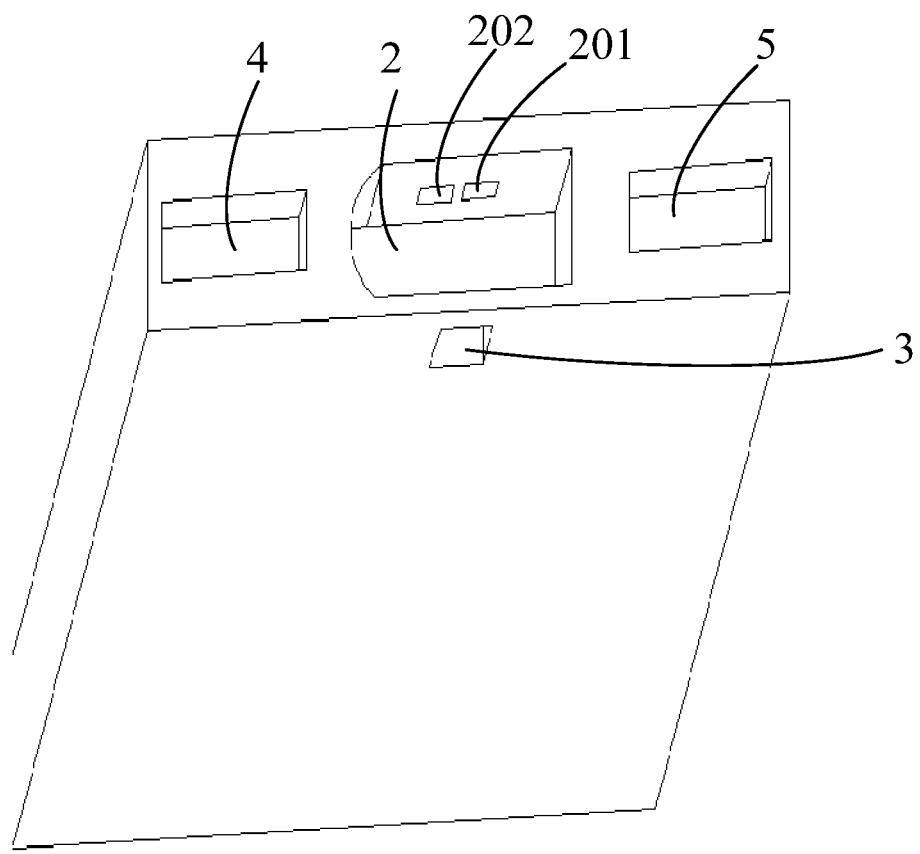
FIG. 3 is a structural diagram of a mobile terminal provided in embodiments of the present disclosure.

Referring to FIGS. 1 to 3, an interface adapter device applied to a mobile terminal including a female connector 2 is shown. The female connector 2 has a first contact 201 and a second contact 202, and the interface adapter device includes a male connector 1 and a third contact 101 and a fourth contact 102 provided on the male connector 1. The male connector 1 has a first end provided with a first interface 103, and a second end provided with a second interface 104, and the first and second ends are two opposite ends of the male connector 1. The third contact 101 is electrically coupled to the second interface 104, the fourth contact 102 is electrically coupled to the first interface 103, and the first and second ends of the male connector 1 are insertable into the female connector 2. When the male connector 1 is inserted into the female connector 2 through the first end, the third contact 101 is in contact with the first contact 201; and when the male connector 1 is inserted into the female connector 2 through the second end, the fourth contact 102 is in contact with the second contact 202.

A first state is a case where the male connector 1 is inserted into the female connector 2 through the first end. The first state is specifically shown in FIG. 1, in which the male connector 1 is inserted into the female connector 2 through the first end along a direction A, so that the third contact 101 comes into contact with the first contact 201 and the first interface 103 is located within the mobile terminal, and the second interface 104 is exposed on a surface of the mobile terminal or outside the mobile terminal. Thereby, it is convenient for a user to insert a data cable having an interface of a same type as the second interface 104. Based on the first state shown in FIG. 1, the male connector 1 can be turned 180 degrees in a horizontal direction of the mobile terminal, and then turned 180 degrees in a vertical direction of the mobile terminal, so that the male connector 1 can be inserted into the female connector 2 through the second end, which is a second state. Specifically, the second state is shown in FIG. 2, in which the male connector 1 is inserted into the female connector 2 through the second end along a direction B, so that the fourth contact 102 comes into contact with the second contact 202 and the second interface 104 is located within the mobile terminal, and the first interface 103 is exposed on the surface the mobile terminal or outside the mobile terminal. As a result, it is convenient for a user to insert a data cable having an interface of a same type as the first interface 103.

The male connector 1 may have an external shape of rectangular parallelepiped. For example, the third contact 101 and the fourth contact 102 may be arranged on two opposite faces of the male connector 1, respectively; and a first end surface at the first end and a second end surface at the second end of the male connector 1 are perpendicular to the above two faces, respectively. In addition, the external shape of the male connector 1 can be based on the rectangular parallelepiped as described above, and one face of the rectangular parallelepiped can be set to an arc face with the purpose of preventing reverse insertion of the male connector into the female connector, for example.

The first contact 201 on the female connector 2 is of a same type as the third contact 101 on the male connector 1, and the first interface 103 at the first end of the male connector 1 has a type corresponding to the first contact 201 and the third contact 101. Similarly, the second contact 202 on female connector 2 is of a same type as the fourth contact 102 on male connector 1, and the second interface 104 at the second end of the male connector 1 has a type corresponding to the second contact 202 and the fourth contact 102. For example, if both the first contact 201 and the third contact 101 are Universal Serial Bus (USB) Type-C metal contacts, then the type of the first interface 103 should also be a USB Type-C metal interface; and if both the second contact 202 and the fourth contact 102 are Micro-USB metal contacts, then the second interface 104 should also be a Micro-USB metal interface.

The third contact 101 and the fourth contact 102 may be any two types of USB Type-C, Micro-USB, and lightning. The specific types of the third contact 101 and the fourth contact 102 on the male connector 1 can be determined according to the specific types of the first contact 201 and the second contact 202 of the female connector 2 on the mobile terminal.

The third contact 101 and the fourth contact 102 may be provided on a same straight line on a same plane on the male connector 1, or may be provided at an upper left corner and a lower right corner of a same plane on the male connector 1, respectively. Of course, they can be provided at a lower left corner or an upper right corner of a same plane, respectively. Alternatively, the third contact 101 and the fourth contact 102 can be located on different planes on the male connector 1. It should be noted that the specific positions of the third contact 101 and the fourth contact 102 are not limited herein.

In the embodiments of the present disclosure, when the male connector is inserted into the female connector through the first end, the third contact is in contact with the first contact, and at this time, the data cable can match the second interface at the second end of the male connector; and when the male connector is inserted into the female connector through the second end, the fourth contact is in contact with the second contact, and at this time, the data cable can match the first interface at the first end of the male connector. In this way, two types of data cables, which have interfaces of the same types as the first and second interfaces respectively, can be compatible with the same mobile terminal, so that the mobile terminal is not limited to matching only one type of data cable and the use of the mobile terminal is more convenient, which reduces the limitation in the use of the mobile terminal.

Optionally, the third contact 101 is provided on a first plane on the male connector 1, and the fourth contact 102 is provided on a second plane on the male connector 1, which is arranged opposite to the first plane. An orthogonal projection of the third contact 101 on the second plane does not intersect the fourth contact 102 on the second plane.

When the first contact 201 and the second contact 202 of the female connector 2 on the mobile terminal are arranged side by side, the third contact 101 can be provided on the first plane on the male connector 1, and the fourth contact 102 can be provided on the second plane on the male connector 1. The orthogonal projection of the third contact 101 on the second plane does not intersect the fourth contact 102 on the second plane, that is, as seen in a direction perpendicular to the second plane, the orthogonal projection of the third contact 101 and the fourth contact 102 on the second plane are separate from each other without any overlapping portion. Moreover, the orthogonal projection of the third contact 101 and the fourth contact 102 are located on a same horizontal line.

In the embodiments of the present disclosure, when the first contact and the second contact of the female connector on the mobile terminal are arranged side by side, the third contact is provided on the first plane on the male connector, and the fourth contact is provided on the second plane on the male connector, and the orthogonal projection of the third contact on the second plane does not intersect the fourth contact on the second plane. With the above-mentioned arrangements of the third contact on the first plane and the fourth contact on the second plane, it is easier to distinguish the third contact from the fourth contact, thereby preventing the occurrence of confusion between the third contact and the fourth contact due to the arrangement of the third and the fourth contacts on the same plane.

Optionally, when the first interface 103 is in the female connector 2, the second interface 104 is not in the female connector 2; or when the second interface 104 is in the female connector 2, the first interface 103 is not in the female connector 2.

When the first end of the male connector 1 is inserted into the female connector 2, the first contact 201 is in contact with the third contact 101, and the second end of the male connector 1 is exposed outside the female connector 2. Thus, the second interface 104 is not in the female connector 2, but the first interface 103 is already in the female connector 2.

When the second end of the male connector 1 is inserted into the female connector 2, the second contact 202 is in contact with the fourth contact 102, and the first end of the male connector 1 is exposed outside the female connector 2. Thus, the first interface 103 is not in the female connector 2, but the second interface 104 is already in the female connector 2.

In the embodiments of the present disclosure, when the first end of the male connector is inserted into the female connector, and the second end of the male connector is exposed outside the female connector; or when the second end of the male connector is inserted into the female connector, the first end of the male connector is exposed outside the female connector. Through the above arrangements, it can be more convenient and labor-saving to pull the male connector out of the female connector.

Optionally, the male connector 1 is provided with a first groove 105, a second groove 106, a third groove 107, and a fourth groove 108, the first groove 105 and the second groove 106 are symmetrically distributed with respect to a center which is the third contact 101, and the third groove 107 and the fourth groove 108 are symmetrically distributed with respect to a center which is the fourth contact 102. Furthermore, a reserved port 3 is provided on the mobile terminal.

When both the first interface 3 and the second interface 4 are located in the female connector 2, the reserved port 3 is in communication with the second groove 106 or the fourth groove 108. Or, when both the first interface 103 and the second interface 104 are located in the female connector 2, the reserved port 3 is in communication with the first groove 105 or the third groove 107.

The first groove 105, the second groove 106, the third groove 107 and the fourth groove 108 may have a same shape. When communicating with the reserved port 3 on the mobile terminal, the first groove 105, the second groove 106, the third groove 107 and the fourth groove 108 may have larger lengths than that of the reserved port 3, and they may have smaller widths than that of the reserved port 3.

When both the first interface 103 and the second interface 104 are located in the female connector 2, the reserved port 3 is in communication with the second groove 106 or the fourth groove 108. Or, when both the second interface 103 and the second interface 104 are located in the female connector 2, the reserved port 3 is in communication with the first groove 105 or the third groove 107. In these cases, if it is required to pull the male connector 1 out of the female connector 2, an object such as a pick can be used to push against the first groove 105, the second groove 106, the third groove 107 or the fourth groove 108 so that the male connector 1 can be pulled out of the female connector 2.

In the embodiments of the present disclosure, by providing the first, second, third and fourth grooves on the male connector, when both the first and second interfaces are located in the female connector, the reserved port is in communication with the second or fourth groove; or when both the first and second interfaces are located in the female connector, the reserved port is in communication with the first or third groove, and in these cases, it is easier to pull the male connector out of the female connector.

Optionally, the first contact 201 is a Micro-USB metal contact, the second contact 202 is a USB Type-C metal contact, the third contact 101 is a Micro-USB metal contact, the fourth contact 102 is a USB Type-C metal contact, the first interface 103 is a USB Type-C interface, and the second interface 104 is a Micro-USB interface.

When the first contact 201 is the Micro-USB metal contact, the second contact 202 may be the USB Type-C metal contact, the third contact 101 may be the Micro-USB metal contact, the fourth contact 102 may be the USB Type-C metal contact, the first interface 103 may be the USB Type-C interface, and the second interface 104 may be the Micro-USB interface. Of course, when the first contact 201 is the USB Type-C metal contact, the second contact 202 may be the Micro-USB metal contact, the third contact 101 may be the USB Type-C metal contact, the fourth contact 102 may be the Micro-USB metal contact, the first interface 103 may be the Micro-USB interface, and the second interface 104 may be the USB Type-C metal contact.

In the embodiments of the present disclosure, by configuring the first and third contacts to be of the same type, the second and fourth contacts to be of the same type, the second interface to correspond to the type of the first and third contacts and the first interface to correspond to the type of the second and fourth contacts, it is possible to achieve the conversion of the two interfaces USB Type-C and Micro-USB on the mobile terminal and increase application scenarios of the mobile terminal.

Optionally, the female connector 2 is further provided with a first lightening metal contact which is arranged side by side with the second contact 202, and the male connector 1 is provided with a second lightning metal contact, which is in contact with the first lightning metal contact when the first interface 103 or the second interface 104 is in the female interface 2, and the Micro-USB interface contains a lightning interface therein.

The female connector 2 may be further provided with the first lightening metal contact, which is arranged side by side with the first contact 201 and the second contact 202. When the first interface 103 or the second interface 104 is in the female connector 2, the second lightning metal contact on the male connector 1 is in contact with the first lightning metal contact, and an end interface is connected as a lightning interface in the Micro-USB interface. Since the lightning interface has a smaller length than the Micro-USB interface, the end interface can be connected as the lightning interface in the Micro-USB interface.

In the embodiments of the present disclosure, through the above arrangements, the mobile terminal can also enable the conversion between these three types of interfaces, i.e., USB Type-C, Micro-USB, and lightning, thereby further increasing the application scenarios of the mobile terminal and reducing the limitation in the use of the mobile terminal.

As shown in FIG. 3, the embodiments of the present disclosure further provide a mobile terminal that includes a female connector 2 provided with a first contact 201 and a second contact 202.

The first contact 201 and the second contact 202 may or may not be arranged side by side on the female connector 2 of the mobile terminal. For example, the first contact 201 and the second contact 202 may be arranged at an upper left corner and an upper right corner on a plane of the mobile terminal, respectively, or may be arranged on different planes of the mobile terminal. It should be noted that, the manners and positions in which the first contact 201 and the second contact 202 are arranged on the mobile terminal are not limited herein.

The female connector 2 of the mobile terminal may be provided with at least two contacts. For example, it may be provided with two, three, or four contacts, and accordingly, the male connector may be also provided with two, three or four contacts, and the types of the contacts on the male connector are in one-to-one correspondence with the types of the contacts on the female connector. It should be noted that there are generally three types of interfaces for the mobile terminal in the related art. Therefore, at most three types of contacts are provided herein.

The above mobile terminal may be a mobile phone, a tablet personal computer, a laptop computer, a personal digital assistant (PDA), a mobile internet device (MID), or a wearable device and so on.

In the embodiments of the present disclosure, by providing the first and second contacts on the mobile terminal and then using them with the male connector to realize the conversion between the two types of interfaces which correspond to the first contact and the second contact, respectively, the application scenarios of the mobile terminal is increased.

Optionally, the first contact 201 is a Micro-USB metal contact and the second contact 202 is a USB Type-C metal contact; or, the first contact 201 is a USB Type-C metal contact and the second contact 202 is a Micro-USB metal contact.

In the embodiments of the present disclosure, the first contact is the Micro-USB metal contact and the second contact is the USB Type-C metal contact; or the first contact is the USB Type-C metal contact and the second contact is the Micro-USB metal contacts. Through such settings and use with the male connector, it is possible to enable the mobile terminal to realize the conversion between the two types of interfaces, i.e., Micro-USB and USB Type-C, thereby making the use of the mobile terminal more convenient.

Optionally, the first contact 201 and the second contact 202 are arranged side by side, and the female connector 2 is further provided with a first lightning metal contact, which is arranged side by side with the second contact.

In the embodiments of the present disclosure, through providing the first lightning metal contact on the female connector of the mobile terminal and use with the male connector, it is possible to enable the conversion between the three types of interfaces, Micro-USB, USB Type-C and lightning, thereby further increasing the application scenarios of the mobile terminal.

Optionally, as shown in FIG. 3, the mobile terminal is further provided with a reserved port 3, which is arranged on the side of the female connector 2.

The mobile terminal may be also provided with a speaker 4 or a headphone jack 5 in a same straight line direction as the female connector. It should be noted that the mobile terminal may be further provided with other components at places marked by 4 and 5 in FIG. 3, such as a screen locking switch or a photographing key, and these places are not limited to the speaker or the headphone jack.

In the embodiments of the present disclosure, by providing the reserved port on the mobile terminal, the male connector can be easily pulled out of the female connector.

The above are only specific implementations of the present disclosure, but the scope of protection of the present disclosure is not limited thereto. Any person skilled in the art can easily think of changes or replacements within the technical scope disclosed in the present disclosure, which are covered by the protection scope of this disclosure. Therefore, the protection scope of the present disclosure shall be defined by the claims.

What is claimed is:

1. An interface adapter device, applied to a mobile terminal comprising a female connector, wherein the female connector comprises a first contact and a second contact; the interface adapter device comprises a male connector and a third contact and a fourth contact provided on the male connector, wherein the male connector comprises a first end provided with a first interface and a second end provided with a second interface, the first and second ends are two opposite ends of the male connector, the third contact is electrically coupled to the second interface, the fourth contact is electrically coupled to the first interface, and the first and second ends of the male connector are insertable into the female connector, wherein the third contact is in contact with the first contact when the male connector is inserted into the female connector through the first end; and the fourth contact is in contact with the second contact when the male connector is inserted into the female connector through the second end.

2. The interface adapter device according to claim 1, wherein the third contact is arranged on a first plane on the male connector, the fourth contact is arranged on a second plane on the male connector, the second plane being opposite to the first plane, and an orthogonal projection of the third contact on the second plane does not intersect the fourth contact on the second plane.

3. The interface adapter device according to claim 2, wherein the second interface is not in the female connector when the first interface is in the female connector.

4. The interface adapter device according to claim 2,
wherein the male connector is provided with a first groove, a second groove, a third groove and a fourth groove, wherein the first groove and the second groove are symmetrically distributed with respect to a center which is the third contact, and the third groove and the fourth groove are symmetrically distributed with respect to a center which is the fourth contact, and the mobile terminal is provided with a reserved port.

5. The interface adapter device according to claim 1, wherein the first contact is a Micro-Universal Serial Bus (Micro-USB) metal contact, the second contact is a USB Type-C metal contact, the third contact is the Micro-USB metal contact, and the fourth contact is the USB Type-C metal contact, the first interface is the USB Type-C interface, and the second interface is the Micro-USB interface.

6. The interface adapter device according to claim 5, wherein the female connector is further provided with a first lightening metal contact which is arranged side by side with the second contact, wherein the male connector is provided with a second lightning metal contact, which is in contact with the first lightning metal contact when the first interface or the second interface is in the female interface, and the Micro-USB interface contains a lightning interface therein.

7. A mobile terminal, comprising a female connector which is provided with a first contact and a second contact, wherein the female connector is adapted to a male connector of an interface adapter device; the interface adapter device comprises the male connector and a third contact and fourth contact provided on the male connector, wherein the male connector comprises a first end provided with a first interface and a second end provided with a second interface, the first and second ends are two opposite ends of the male connector, the third contact is electrically coupled to the second interface, the fourth contact is electrically coupled to the first interface, and the first and second ends of the male connector are insertable into the female connector, wherein the third contact is in contact with the first contact when the male connector is inserted into the female connector through the first end; and the fourth contact is in contact with the second contact when the male connector is inserted into the female connector through the second end.

8. The mobile terminal according to claim 7, wherein the first contact is a Micro-USB metal contact, and the second contact is a USB Type-C metal contact; or the first contact is a USB Type-C metal contact, and the second contact is a Micro-USB metal contact.

9. The mobile terminal according to claim 7, wherein the first contact and the second contact are arranged side by side, and the female connector is further provided with a first lightning metal contact, which is arranged side by side with the second contact.

10. The mobile terminal according to claim 7, wherein the mobile terminal is further provided with a reserved port that is arranged on the side of the female connector.

11. The interface adapter device according to claim 2, wherein the first interface is not in the female connector when the second interface is in the female connector.

12. The interface adapter device according to claim 4, wherein the reserved port is in communication with the second groove or the fourth groove when both the first and second interfaces are located in the female connector.

13. The interface adapter device according to claim 4, wherein the reserved port is in communication with the first groove of the third groove when both the first and second interfaces are located in the female connector.

14. The interface adapter device according to claim 1, wherein the male connector has an external shape of rectangular parallelpiped.

15. The interface adapter device according to claim 14, wherein one face of the male connector having the shape of rectangular parallelpiped is an arc face.

16. The mobile terminal according to claim 8, wherein the first contact and the second contact are arranged side by side, and the female connector is further provided with a first lightning metal contact, which is arranged side by side with the second contact.

17. The mobile terminal according to claim 8, wherein the mobile terminal is further provided with a reserved port that is arranged on the side of the female connector.

18. The mobile terminal according to claim 7, wherein the first contact and the second contact are not arranged side by side.

19. The mobile terminal according to claim 18, wherein the first contact and the second contact are provided at an upper left corner and an upper right corner of a plane of the mobile terminal, respectively.

20. The mobile terminal according to claim 18, wherein the first contact and second contact are provided on different planes.

* * * * *